US009949119B2

(12) United States Patent
Seedorf et al.

(10) Patent No.: US 9,949,119 B2
(45) Date of Patent: Apr. 17, 2018

(54) METHOD AND SYSTEM FOR ASSESSING A MESSAGE IN A DECENTRALIZED COMMUNICATION NETWORK

(71) Applicant: NEC EUROPE LTD., Heidelberg (DE)

(72) Inventors: Jan Seedorf, Heidelberg (DE); Dirk Kutscher, Heidelberg (DE); Fabian Schneider, Heidelberg-Bahnstadt (DE)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 14/911,737

(22) PCT Filed: Feb. 17, 2014

(86) PCT No.: PCT/EP2014/053041
§ 371 (c)(1),
(2) Date: Feb. 12, 2016

(87) PCT Pub. No.: WO2015/096906
PCT Pub. Date: Jul. 2, 2015

(65) Prior Publication Data

US 2016/0192192 A1 Jun. 30, 2016

(30) Foreign Application Priority Data

Dec. 23, 2013 (EP) .................................... 13199315
Jan. 17, 2014 (WO) ................ PCT/EP2014/050953

(51) Int. Cl.
*H04L 29/06* (2006.01)
*H04W 12/06* (2009.01)
*H04L 9/32* (2006.01)

(52) U.S. Cl.
CPC ........... *H04W 12/06* (2013.01); *H04L 9/3247* (2013.01); *H04L 9/3265* (2013.01);
(Continued)

(58) Field of Classification Search
CPC .... H04W 12/06; H04L 9/3247; H04L 9/3265; H04L 63/126; H04L 63/0823; H04L 2463/081
(Continued)

(56) References Cited

U.S. PATENT DOCUMENTS 9,350,599 B1 * 5/2016 Enright .................. G06F 21/43
2002/0004900 A1 * 1/2002 Patel ..................... G06Q 30/02
713/155

(Continued)

FOREIGN PATENT DOCUMENTS

WO WO 2009065923 A2 5/2009
WO WO 2009132668 A1 11/2009

OTHER PUBLICATIONS

Arumaithurai University of Goettingen J Seedorf A Tagami KDDI R&R Labs K Ramakrishnan AT&T N Blefari Melazzi Univ Tor Vergata M: "Using ICN in disaster scenarios; draft-seedorf-icn-disaster-01.txt", Using ICN in Disaster Scenarios; Draft-Seedorf-ICN-Disaster-=!.TXT, Internet Engineering Task Force, IETF; Standardworkingdraft, Internet Society (ISOC) 4, Rue Des Falaises CH-1205 Geneva, Switzerland, Oct. 21, 2013 (Oct. 21, 2013), pp. 1-9, XP015095769.

*Primary Examiner* — Mohammad W Reza
(74) *Attorney, Agent, or Firm* — Leydig, Voit & Mayer, Ltd.

(57) ABSTRACT

A method for assessing a message transmitted between at least: two parties via a previously unknown third party in a decentralized communication network, wherein all parties share a common trust architecture, includes publishing, on-behalf-of indication and public, security information of the third party; publishing, the message of the first party; evaluating the published information to extract published content of the first party by the second party as intended receiver of the message; verifying a real-world-identity of
(Continued)

the third party and/or the signature of the third party based on the previously received trust information and/or based on the self-certifying name and the public security information of the third party; checking a trust information chain according to the common trust architecture from the second party to the third party; and assessing the content of the first party based on the checked trust chain.

11 Claims, 7 Drawing Sheets

(52) U.S. Cl.
CPC ........ *H04L 63/0823* (2013.01); *H04L 63/126* (2013.01); *H04L 2463/081* (2013.01)

(58) Field of Classification Search
USPC .......................................................... 713/176
See application file for complete search history.

(56) References Cited

U.S. PATENT DOCUMENTS

| | | | | |
|---|---|---|---|---|
| 2013/0262857 | A1* | 10/2013 | Neuman | H04L 63/08<br>713/155 |
| 2014/0282835 | A1* | 9/2014 | Guinan | G06F 21/6218<br>726/1 |
| 2015/0237031 | A1* | 8/2015 | Neuman | H04L 63/08<br>713/176 |

* cited by examiner

METHOD AND SYSTEM FOR ASSESSING A MESSAGE IN A DECENTRALIZED COMMUNICATION NETWORK

CROSS REFERENCE TO RELATED APPLICATIONS

This application is a U.S. National Stage Application under 35 U.S.C. § 371 of International Application No. PCT/EP2014/053041 filed on Feb. 17, 2014, and claims benefit to European Patent Application No. EP 13199315.6 filed on Dec. 23, 2013 and International Application No. PCT/EP2014/050953 filed on Jan. 17, 2014. The present International Application was published in English on Jul. 2, 2015 as WO 2015/096906 A1 under PCT Article 21(2).

STATEMENT REGARDING SPONSORED RESEARCH OR DEVELOPMENT

The work leading to this invention has received funding from the European Union's Seventh Framework Programme (FP7/2007-2013) under grant agreement no 608518.

FIELD

The present invention relates to a method for assessing a message transmitted between at least two parties in a decentralized communication network, preferably a fragmented communication network. The present invention further relates to a system for assessing a message transmitted between at least two parties in a decentralized communication network, preferably a fragmented communication network.

BACKGROUND

Although applicable to communication networks in general the present invention will be described with regard to a mobile network. Although applicable in general to any trust architecture, the present invention will be described with regard to a web-of-trust.

Usually a communication network is organized in a central manner with centralized entities and one or more base stations connected to the centralized entities to which users can connect with their mobile devices. However in a disaster, for example when an earthquake destroys some of the connections of the network, the network is fragmented into several network "islands" due to failed connection links to the centralized entities. However, users can still move among several of the network islands over time, for example a user walking towards help/rescue with his mobile phone, trying to connect to functional base stations along the way, and connect each time to any functional network equipment in each "visited" island of the fragmented network. Due to the disconnected islands a user cannot use the centralized entities of the communication network, for example to authenticate a received message. In non-fragmented mobile communication networks, for example users are authenticated via the centralized entities and therefore an authentication in a fragmented network is not possible, due to a disconnection from servers of a security infrastructure such as a public key infrastructure or the like.

Conventional methods which do not rely on a trusted third party like the centralized authentication entity use, for example, so-called self-certifying names having the property that any entity in a distributed system can verify a binding between a corresponding public key and a self-certifying name without relying on a trusted third party, see for example in the non-patent-literature of T. Aura: "Cryptographically Generated Addresses (CGA)", RFC 3972. Therefore for example a first party is enabled to digitally sign data associated with a self-certifying name and any receiving second party can verify the signature without relying on the trusted third party like a central authentication authority. However, self-certifying names lack a binding between a corresponding real-world identity: Self-certifying names enable to verify that whoever signed data was in possession of a private key associated with the self-certifying name but do not enable to verify what real-world entity corresponds to the public key, i.e. who actually signed the data, e.g. as mentioned in the non-patent literature of A. Ghodsi et al.: "Naming in Content-Oriented Architectures", 1st Sigcomm ICN Workshop, 2011.

To overcome this problem in the non-patent literature of J. Seedorf: "Using Cryptographically Generated SIP-URIs to Protect the Integrity of Content in P2P-SIP", 3rd VoIP Security Workshop, 2006 was disclosed to provide such a binding between a public key and a real-world identity a public key infrastructure or a web-of-trust is used. However, one of the problems is that the number of trust relationships in a web-of-trust scales exponentially with the number of web-of-trust users.

SUMMARY

In an embodiment the present invention provides a method for assessing a message transmitted between at least two parties via a previously unknown third party in a decentralized communication network, wherein all parties share a common trust architecture, wherein the message includes content of a first party intended for a second party and published by a third party, and wherein a name of the first party and/or a name of the second party includes a first part including a self-certifying component and a second part including an indication of an on-behalf-of publication or not, and wherein the self-certifying component of the first party is previously provided to the second party, and wherein the parties have received at least one trust information component according to the common trust architecture. The method includes publishing, under the name of the first party with an on-behalf-of indication of a name of the third party with on-behalf-of indication and public security information of the third party; publishing, under a combination of an on-behalf-of name of the first part and the third party, the message of the first party, wherein the message is signed by the third party; evaluating the published information to extract published content of the first party by the second party as intended receiver of the message; verifying a real-world-identity of the third party and/or the signature of the third party over the extracted message based on the previously received trust information and/or based on the self-certifying name and the public security information of the third party; checking a trust information chain according to the common trust architecture from the second party to the third party; and assessing the content of the first party based on the checked trust information chain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
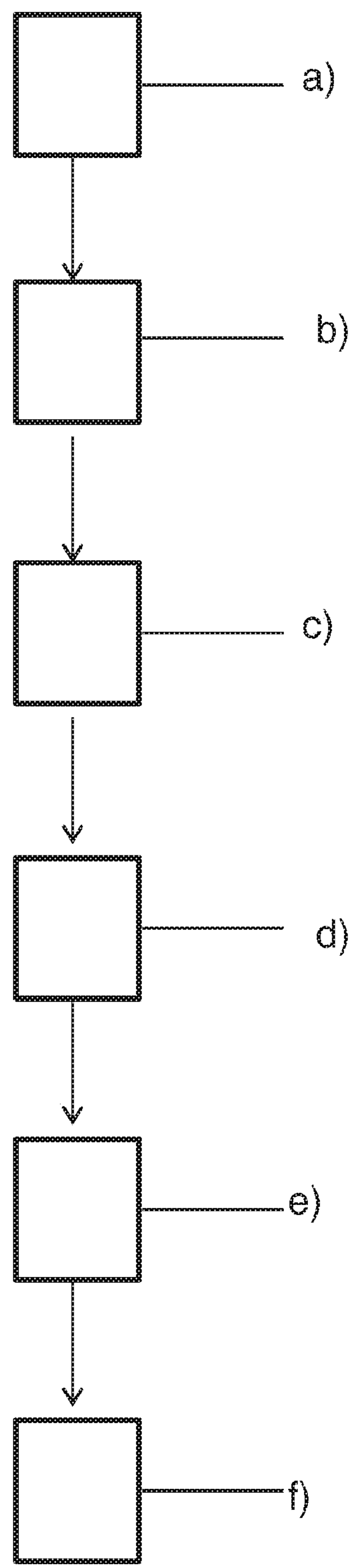
FIG. 1 shows steps of a method according to a first embodiment of the present invention.

In an embodiment, the present invention provides a method and a system for assessing a message which works in offline scenarios, i.e. with respect to a disconnected central authentication infrastructure while being easy to implement and requiring only few resources for processing, providing and/or analyzing trust relationships in a common trust architecture.

In an embodiment, a method is provided for assessing a message transmitted between at least two parties via a previously unknown third party in a decentralized communication network, preferably a fragmented communication network, wherein all parties share a common trust architecture, preferably a web-of-trust, wherein the message comprising content of a first party intended for a second party is published by a third party, and wherein a name of a party comprises at least two parts, wherein one the parts being a self-certifying component and another part being an indication indicating an on-behalf-of publication or not, and wherein the a self-certifying component of the first party is previously provided to the second party, and wherein the parties have received at least one trust information according to the common trust architecture, comprising the steps of:

a) Publishing under the name of the first party with on-behalf-of indication the name of the third party with on-behalf-of indication and public security information of the third party,
b) Publishing under a combination of the on-behalf-name of the first and third party the message of the first party, wherein the message is signed by the third party,
c) Evaluating the published information in step a) and step b) to extract the published content of the first party by the second party as intended receiver of the message,
d) Verifying the real-world-identity of the third party and/or the signature of the third party over the extracted message based on the previously received trust information and/or based on the self-certifying name and the public security information of the third party,
e) Checking a trust information chain according to the common trust architecture from the second party to the third party, f) Assessing the content of the first party based on the checked trust chain.

In an embodiment, a system is provided for assessing a message transmitted between at least two parties in a decentralized communication network, preferably a fragmented communication network, wherein all parties share a common trust architecture, preferably a web-of-trust, wherein the message comprising content of a first party intended for a second party is published by a third party, and wherein a name of a party comprises at least two parts, wherein one the parts being a self-certifying component and another part being an indication indicating an on-behalf-of publication or not, and wherein the a self-certifying component of the first party is previously provided to the second party, and wherein the parties have received at least one trust information according to the common trust architecture.

The third party is operable to publish under the name of the first party with on-behalf-of indication the name of the third party with on-behalf-of indication and public security information of the third party, to publish under a combination of the on-behalf-name of the first and itself the message of the first party, wherein the message is signed by the third party. The second party as intended receiver of the message is operable to evaluate the published information by the third party to extract the published content of the first party, to verify the real-world-identity of the third party and/or the signature of the third party over the extracted message based on the previously received trust information and/or based on the self-certifying name and the public security information of the third party, to check a trust information chain according to the common trust architecture from itself to the third party, and to assess the content of the first party based on the checked trust chain.

According to an embodiment of the invention, a cryptographically verifiable decentralized authentication of messages in scenarios when being "offline" from an authentication infrastructure is enabled.

According to an embodiment of the invention, a transitive assessment of the trustworthiness on behalf of message is enabled.

According to an embodiment of the invention, for assessing of a message only few computational resources are needed, since e.g. the evaluating and storage of a chain of trust information requires less storage than saving all trust information itself.

According to an embodiment of the invention, generating and evaluation of a trust information chain computation services can be easily implemented.

According to an embodiment of the invention, in particular self-certifying names and real-world identities are "tied" together or connected with each other.

According to a preferred embodiment, the parts of the name of a party are concatenated, preferably with a marker between the two parts. For example by dividing name of the party into the two parts a so-called context related part can be used to indicate the on-behalf-of property of the published information so that when checking a name the content which is published under the name together with the self-certifying part of the party from which the content originates can be evaluated. By using a marker, e.g. a string in form of a ":", "." or the like enables an easy determination of the two parts, simply by searching for the marker and then based on the position determine both parts. The name of the party may be provided in form of a text string or the like. The context related part may only comprise predefined values, e.g. in form of text strings for an easy and fast indication whether a publication of information under the name is directly published by the party providing the content or indirectly by a further party not providing the content and not identical with the party providing the content.

According to a further preferred embodiment the self-certifying component is provided in form of cryptographic information, preferably of a cryptographic hash of public security information, preferably in form of a public key. This enables to determine in an easy way the self-certifying component based on publicly available information, preferably in form public security information.

According to a further preferred embodiment the public security information is used for identification with the common trust architecture. This enables an easy and efficient way to determine for example the real-world identity of the third party by the second party since the public security information may be used as the key-ID in the common trust architecture. Therefore an association between real-word-identities and self-certifying components is enabled when preferably the cryptographic hash of the public key is used as key-ID in a Web-of-Trust.

According to a further preferred embodiment in step d) a network-wide cryptographic hash function is used on the public security information of the third party to obtain the identification of the third party, preferably by querying a functional decentralized node. This enables to extract key-ID out of the public security information by each party without having to contact a centralized entity or the like in a reliable way.

According to a further preferred embodiment a functional decentralized local node is queried for the real-world identity of the first party by the third party to determine the self-certifying component of the first party. This enables the third party to determine the self-certifying name of the first party since the first party usually cannot provide the self-certifying name without his mobile device to the third party. Therefore when the third party sends a query to any functional local trust server or node in a currently visited fragment network for the real-world identity of the first party he will receive the identity of the first party and then the third party can derive the self-certifying name of the first party in an easy way.

According to a further preferred embodiment for obtaining the trust information chain one or more functional decentralized local nodes located within the decentralized communication network are queried, wherein a functional decentralized local node provides trust information. Then the parties itself do not need to store trust information for a longer time neither in a fully functioning centralized communication network, nor in a fragmented communication network saving computational and storage resources.

According to a further preferred embodiment trust information is provided in form of web-of-trust file or a binding file comprising real-world identity information associated with corresponding public security information. This enables using a standard common architecture like a web-of-trust for providing trust information enabling therefore an easy implementation.

According to a further preferred embodiment the trust information is generated and updated by a functional decentralized local node in a part of the decentralized network to which the parties can connect. This enables for example to update the trust information enhancing the flexibility. Even further a plurality of such functional decentralized local nodes may update each other when for example these are located within the same network fragment of the decentralized communication network.

According to a further preferred embodiment step e) includes evaluating the length of the trust information chain and/or the number of independent paths between the first party and the second party. This may be based on a predefined threshold, for example in the following way: If the length is determined to be below a predefined threshold then the second party does not trust the message of the third party with content of the first party. If the length of the trust chain exceeds the threshold then it can be assumed that the third party is trustworthy and therefore the content of the first party sent via the third party can be trusted. To mitigate attacks on the trust information chain the number of independent paths can be evaluated so e.g. when the number is below a certain threshold an attacker might need to infiltrate only a small number of paths, therefore an attack would be easy and then a party might decide that the message is not to be trusted due to the possibility of an easy attack.

According to a further preferred embodiment the trust information chain is obtained by using a double-side breadth search first algorithm on the trust information, preferably in form of a web-of-trust file. The time complexity of such a double-side breadth search first algorithm is $O(2b^{d/2})$ where b is the branching factor and d is the depth of the corresponding graph. Such a double-side breadth search first algorithm is computationally feasible.

According to a further preferred embodiment trust information is revoked and/or updated upon a request of a party. This enhances further the flexibility since even in a disaster scenario in a fragmented network users can revoke trust information, e.g. certificates at least within their network fragment allowing a limited functionality of a trust server within the network fragment.

According to a further preferred embodiment the trust information is compressed prior to storing. This saves computational resources, in particular storage space, preferably in case when end-user devices download the trust information.

According to a further preferred embodiment the trust information is provided in form of first real-world-identities are listed sequentially, followed by a list of corresponding key-IDs in the same order and preferably followed by a sequential list listing for each key-ID the key-ID it has signed. This enables an efficient storage of the trust information.

FIG. 1 shows steps of a method according to a first embodiment of the present invention. In FIG. 1, steps a)-f) for assessing a message transmitted between at least two parties via a previously unknown third party in a decentralized communication network, preferably a fragmented communication network, wherein all parties share a common trust architecture, preferably a web-of-trust, wherein the message comprising content of a first party intended for a second party is published by a third party, and wherein a name of a party comprises at least two parts, wherein one the parts being a self-certifying component and another part being an indication indicating an on-behalf-of publication or not, and wherein the a self-certifying component of the first party is previously provided to the second party, and wherein the parties have received at least one trust information according to the common trust architecture are shown.

Step a) publishing under the name of the first party with on-behalf-of indication the name of the third party with on-behalf-of indication and public security information of the third party.

Step b) publishing under a combination of the on-behalf-name of the first and third party the message of the first party, wherein the message is signed by the third party.

Step c) evaluating the published information in step a) and step b) to extract the published content of the first party by the second party as intended receiver of the message.

Step d) verifying the real-world-identity of the third party and/or the signature of the third party over the extracted message based on the previously received trust information and/or based on the self-certifying name and the public security information of the third party.

Step e) checking a trust information chain according to the common trust architecture from the second party to the third party, and Step f) assessing the content of the first party based on the checked trust chain.

Figure 2:
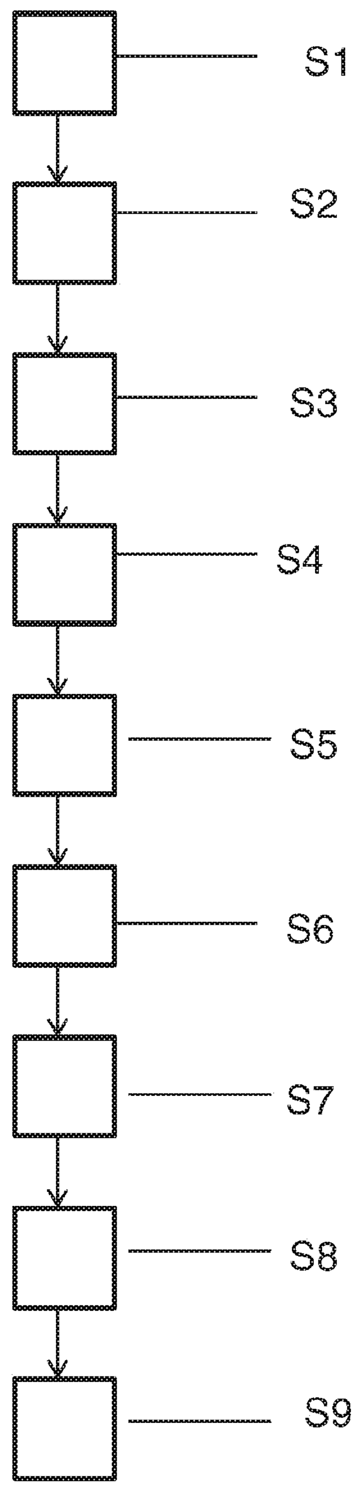
FIG. 2 shows steps of a method according to a second embodiment of the present invention.

FIG. 2 shows steps of a method according to a second embodiment of the present invention. FIG. 2 uses the following naming scheme: names of parties are denoted in a self-certifying naming scheme as [cp:scp], where ":" is the concatenation operator, cp is a "context" part, and scp is a "self-certifying" part. This notation is similar to the often used [L:P] notation of names, where "P is a cryptographic hash of a principal's public key and L is the label", for example as disclosed in the non-patent literature of A. Ghodsi et al.: "Naming in Content-Oriented Architectures", 1st Sigcomm ICN Workshop, 2011. In FIG. 2 the cp part provides some sort of context through pre-defined labels, and the scp part is cryptographic hash of the principal's public key.

The method according to FIG. 2 works as follows: In a first step S1 the second party Y wants to retrieve information about the first party X, so the second party Y e.g. frequently tries to resolve two names that contain a context part, denoted with cp and a self-certifying part, denoted with scp. cp is reserved string and scp is a cryptographic hash of a public key, e.g. $scp_X$ denotes the hash of the public key of the first party X. The first party X and the second party Y have a direct relationship, so it is assumed that the second party Y has the self-certifying name under which the first party X publishes information, $scp_X$, e.g. stored in her mobile phone.

The names for the first party X to receive published information from the first party X, which are denoted with [ . . . ] and that the second party Y tries to resolve are:

a. [$cp_{imp}$:$scp_X$]: This is the default name for the first party X to publish information himself. The term "imp" indicates that the information is important taking into account a disaster scenario. Of course any information can by published by the first party X under this name. Since the first party X does not have a functioning device, e.g. the mobile phone of the first party X was broken during the disaster, the first party X does not or cannot publish under this name, and thus the second party Y will not retrieve any result for a name resolution query of the default name, b. [$cp_{obotrans}$:$scp_X$]: This is a default, reserved transitive "on-behalf-of" name for the first party X. The first party X is not able to sign messages as the first party X does not have a working device. However, the third party Z can publish data under the name [$cp_{obotrans}$:$scp_X$]. The reserved context $cp_{obotrans}$ signals to a content distribution architecture that this is a transitive "on-behalf-of" publication of content, so the self-certifying property will not be checked as the third party Z cannot directly sign with the private key of the first party X that would correspond to $scp_X$. The authenticity of the content published under [$cp_{obotrans}$:$scp_X$] can therefore also not be checked directly; this needs to happen transitively as outlined below in the next steps.

In a second step S2 and since the third party Z does not know $scp_X$ (and the first party X would likely not know $scp_X$ without his device, e.g. his mobile phone), the second party Z sends a query to any functional DW-node in his currently visited fragmented network for $RWI_X$, i.e. the RWI of the first party X (which presumably the first party X can tell to the third party Z). The DW-node will return $ID_X$ using its latest (retrieved prior to the disaster) WoT-file. From $ID_X$, the third party Z can derive $scp_X$ easily, as always holds $ID_X$=$scp_X$ in the scheme. A DW-node is an abbreviation for a Decentralized Web-of Trust node which in case of a functioning network can download a web-of-trust file from the centralized entities, e.g. a central keyserver.

In a third step S3 every time third party Z reaches a new network fragment, the third party Z publishes as content for the name [$cp_{obotrans}$:$scp_X$] his own non-transitive "on-behalf-of" name [$cp_{obo}$:$scp_Z$] along with his public key $pk_Z$. The reserved context $cp_{obo}$ signals that this is a non-transitive "on-behalf-of" name.

In a forth step S4 the third party Z publishes under the name [$cp_{obo}$:$scp_Z$:$scp_X$] as content the message from the first party X, M, signed by the third party Z.

In a fifth step S5 the second party Y will retrieve as result for querying for the name [$cp_{obotrans}$:$scp_X$] the name [$cp_{obo}$:$scp_Z$] and the public key $pk_Z$. The reserved context $cp_{obo}$ signals to the second party Y that this is a non-transitive "on-behalf-of" name for $scp_Z$.

In a sixth step S6 optionally the second party Y can now query any functional DW-node in her currently visited fragmented network for the real-world identity RWI belonging to the key-ID of the third party Z, $id_Z$=h($pk_Z$), where h( ) is a network-wide hash-function. The DW-node will return $RWI_Z$ for $id_Z$, using its latest WoT-file, which was retrieved e.g. prior to a disaster before fragmented networks appear. Thus, this optional query would give the second party Y as result the real-world identity of the third party Z, $RWI_Z$.

In a seventh step S7 the second party Y now knows that some third party Z published data on behalf of the first party X. The second party Y can resolve the name [$cp_{obo}$:$scp_Z$:$scp_X$], which she preferably formed by appending the self-certifying name of the first party X to the obtained data item [$cp_{obo}$:$scp_Z$] from the previous fifth step S5 to obtain the message M from the first party X, published and signed by the third party Z. Using the self-certifying property, the second party Y can verify the signature over M by the third party Z by using $pk_Z$ and h( ). Further, as the hash of the public key is the key-ID in the WoT, the second party Y can be sure that indeed the RWI of Z, $RWI_Z$, is part of the WoT.

In an eighth step S8 the second party Y can now query any functional DW-node in her currently visited fragmented network for the certificate chain from its own key-ID, $id_Y$, to the key-ID of the third party Z, $id_Z$, in the Web-of-Trust WoT. Using a double-side breadth search first (dBFS) algorithm on the WoT-file, the DW-node can determine this certificate chain. The time complexity of a dBFS algorithm is $O(2b^{d/2})$ where b is the branching factor and d is the depth of the graph. The execution of such a dBFS algorithm is computationally very feasible on today's hardware for common WoT files.

In a ninth step S9 depending on properties of the certificate chain, e.g. its length, the second party Y can decide whether to trust the third party Z, and therefore whether to regard the original message M from the first party X as authentic.

Figure 3:
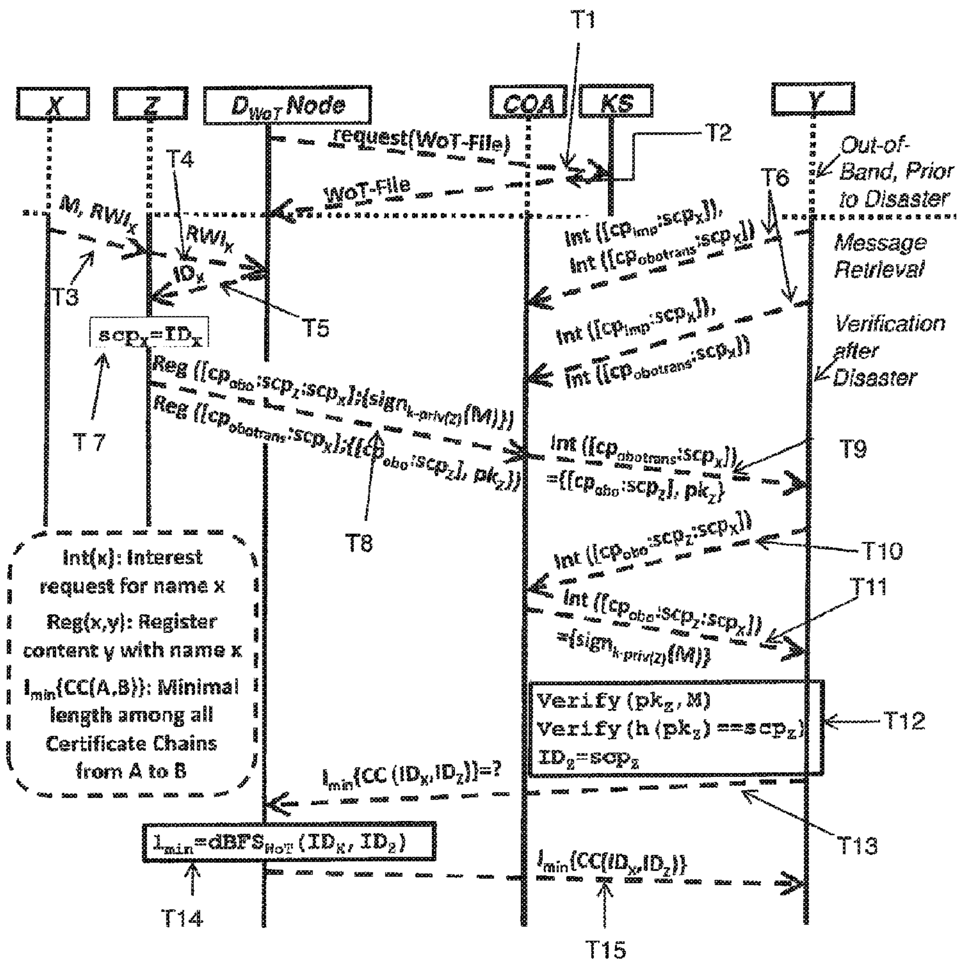
FIG. 3 shows a message flow of a method according to a third embodiment of the present invention.

FIG. 3 shows a message flow of a method according to a third embodiment of the present invention. In FIG. 3 a message flow among the participating parties is shown, where COA is a content-oriented architecture and KS is a web-of-trust key server. The parties do not need to know or see any self-certifying name or any key-ID. All users or parties respectively have to know is their real-world identity, for example an E-mail address from which the corresponding self-certifying name being equivalent to the web-of-trust key-identification here can be derived via the web-of-trust WoT file. The content-oriented architecture is only used as means for publishing and retrieving content for a name.

Prior to a disaster an out-of-band communication between the key server KS and a so-called $D_{WoT}$ node respectively a DW-node is performed wherein the $D_{WoT}$ node requests a web-of-trust file from the key server KS, denoted with reference sign T1 and the key server KS transmits the web-of-trust WoT file to the $D_{WoT}$ node, denoted with reference sign T2.

The $D_{WoT}$ node is preferably a simplified version of a distributed web-of-trust key server network with limited functionality. These $D_{WoT}$ nodes preferably only possess a compressed version of a web-of-trust certificate graph but not all the corresponding certificates themselves as a regular web-of-trust key server would. Such a compressed web-of-trust file can be trusted since it has produced and obtained by a trustworthy central web-of-trust key server prior to a disaster where the network is fully functioning. The $D_{WoT}$ node can therefore offer using the web-of-trust WoT file for a) given real-world identity answer with the corresponding web-of-trust key-ID, b) given a web-of-trust key-ID answer with a real-world identity and c) given two web-of-trust key-IDs answers with a certificate chain between these key-IDs. By using certificate graphs or more general a trust chain between two parties a lightweight decentralized usage of the inherent trust relationships is enabled.

When therefore, after the disaster, the first party X wants to send a message to a second party Y, the first party X provides the message M with corresponding content and its real-world identity $RWI_X$ to the third party Z, denoted with reference sign T3.

For receiving a message M of the first party X the second party Y checks the content-oriented architecture COA for information published under the names [$cp_{imp}$:$scp_X$] and [$cp_{obotrans}$:$scp_X$], i.e. the default name for the first party X to publish information and the default on-behalf-of name of the first party by sending and interest request for each of the names separately, which is denoted with reference sign T6. This be performed by the second party periodically to check for messages of the first party X or only once to register such a request at the content-oriented architecture COA, meaning that the content-oriented architecture provides the second party Y the information of a publication of a message under one or both of these names.

The third party Z then queries the $D_{WoT}$ node with the real world identity $RWI_X$ of the first party X, denoted with reference sign T4 and receives the ID of the first party X $ID_X$, denoted with reference sign T5.

The third party Z then associates the received identification of the first party X as self-certifying component for the first party X, denoted with reference sign T7: $scp_X$=$ID_X$ Then the third party Z registers the content [$cp_{cbo}$:$scp_Z$], $pk_z$ with the name [$cp_{obotrans}$:$scp_X$] with the content-oriented architecture COA as well as the content $sign_{k\text{-}priv(Z)}$(M) with the name [$cp_{obotrans}$:$scp_Z$:$scp_X$] also with the content-oriented architecture COA, which is denoted with reference sign T8.

Since information has been published by the first party under one of the names specified in step T6, the content oriented architecture then provides for the name [$cp_{obotrans}$:$scp_X$] the content [$cp_{cbo}$:$scp_Z$], $pk_z$ to the second party Y, which is denoted with reference sign T9.

The second party Y then sends an interest request for the concatenated name comprising received on behalf of name of the third party Z and the self-certifying part of the first party X [$cp_{obotrans}$:$scp_Z$:$scp_X$] to the content-oriented architecture COA, denoted with reference sign T10.

The content-oriented architecture COA then sends the message m $sign_{k\text{-}priv(Z)}$(M) signed with the private key k-priv (Z) of the third party Z back to the second party Y, denoted with reference sign T11.

The second party Y then verifies the signature over the message M by the third party Z, i.e. the second party Y can verify that the message M could have only been signed by the third party Z. Further the second party Y verifies if the hash of the public key of the third party Z $h(pk_Z)$ equals the self-certifying part of the third party Z, i.e. the second party Y verifies if a hash of the public key of a third party is the key-ID in the corresponding web-of-trust WoT, so that the second party Y can be sure that the real-world identity of the third party Z, $RWI_Z$, is part of the web-of-trust: $ID_Z$=$scp_Z$, which is all denoted with the reference sign T13.

Then in a further step T14 the second party Y queries a $D_{WoT}$ node for a minimal length among all certificate chains from the second party Y to the third party Z, denoted with reference sign T14: $1\{CC(ID_Y,ID_Z)\}$=?

The $D_{WoT}$ node then performs a double-side breadth search first algorithm $dBSF_{WoT}$ on the corresponding web-of-trust WoT file for the identities of the second and third party $ID_Y$,$ID_Z$ which is denoted with reference sign T14, determines the minimal length among all the certificate chains from the second party Y to the third party Z and reports this minimal length $L_{min}$ back to the second party Y for evaluation, denoted with reference sign T15.

Depending on the properties of the certificate chain, here its minimal length $L_{min}$, the second party Y can decide whether to trust the third party Z and therefore whether to regard the original message M from the first party X as authentic.

As a further option alternatively instead of the $D_{WoT}$ nodes end-user devices of the parties itself, e.g. smartphones, tablets or the like can act as $D_{WoT}$ node themselves. They can then download the current web-of-trust file from a trusted web-of-trust key server when still being online and—when offline, for example after a disaster has struck and networks are fragmented—use this file to search for real-world identities and key-IDs and may compute certificate chains itself. This enables a third party message assessment while only having delay tolerant network-like connections among end-user devices instead of requiring functional $D_{WoT}$ nodes as part of the fragment network.

Figure 4:
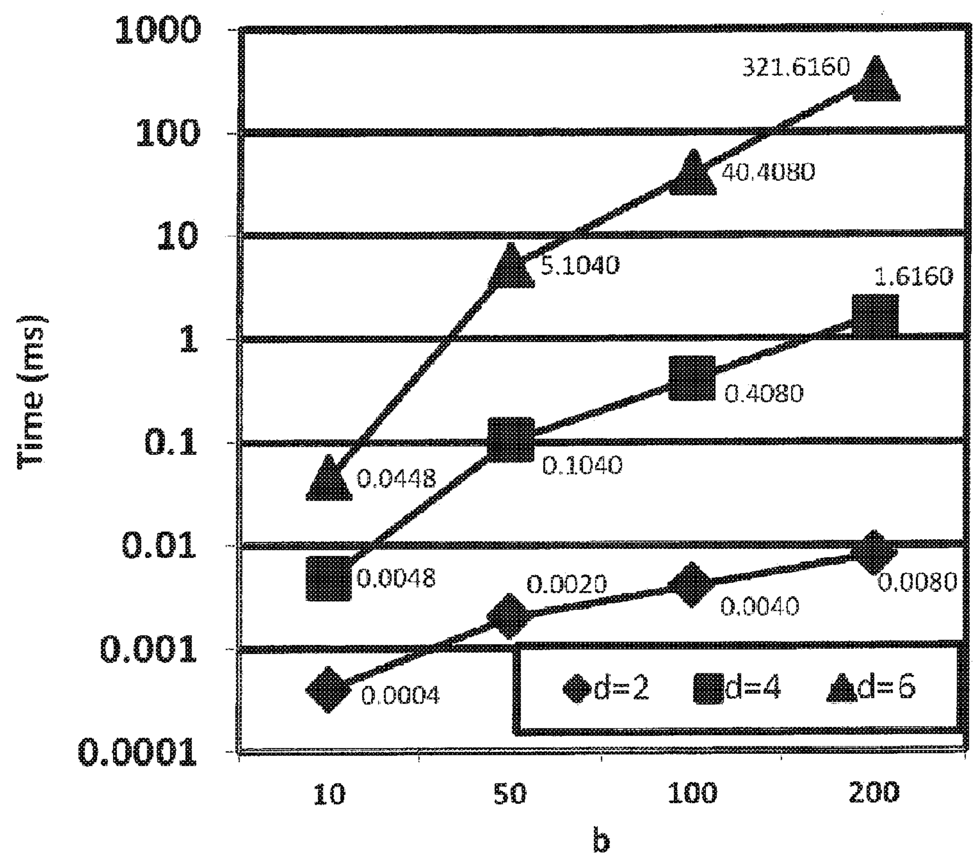
FIG. 4 shows the time needed to find a trust chain of a method according to a fourth embodiment of the present invention.
Figure 5:
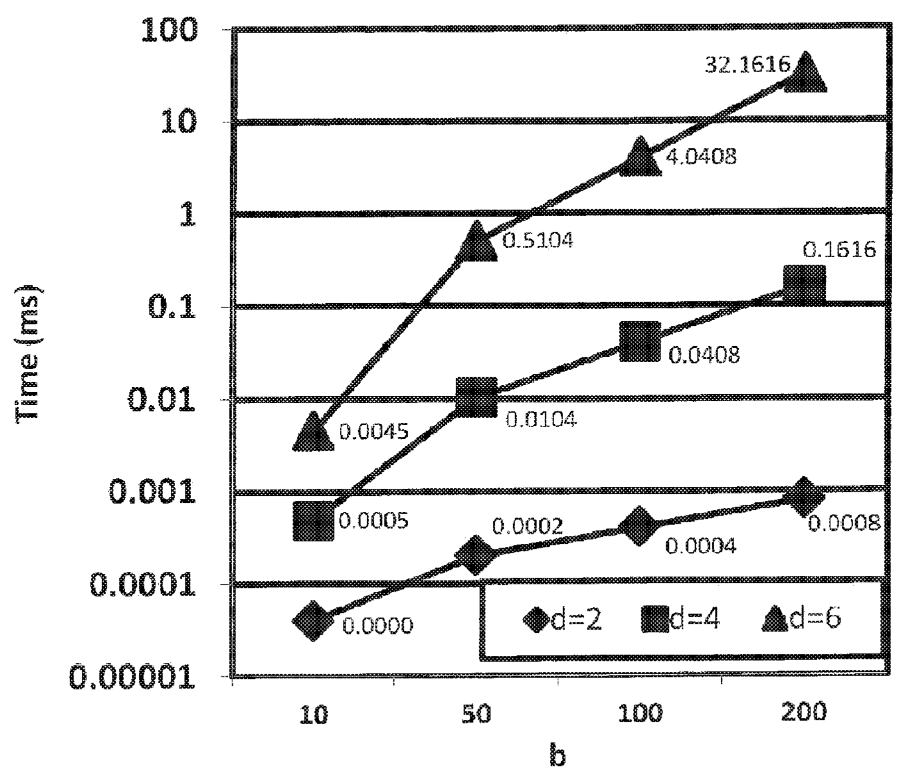
FIG. 5 shows the time needed to find a trust chain of a method according to a fifth embodiment of the present invention.

FIG. 4 shows the time needed to find a trust chain of a method according to a fourth embodiment of the present invention and FIG. 5 shows the time needed to find a trust chain of a method according to a fifth embodiment of the present invention.

In FIGS. 4 and 5 a time is shown needed to find a certificate graph depending on the branching factor b and the depth of the search d of a dBFS algorithm for a moderately powered end-user device with 0.05 GTEPS and a powerful smart phone with 0.5 GTEPS respectively in FIG. 5. FIGS. 4 and 5 show how the dBFS algorithm scales with increasing web-of-trust file sizes and its performance on common smart phones.

The time complexity in space-complexity of a double-sided BFS algorithm is both $O(b^{d/2})$ with a branching factor b and the depth d of the search. Here d is the certificate path length and b is the average number of identities a member of the web-of-trust has signed. The average time t( ) and space s( ) needed for a dBFS algorithm can be derived as follows assuming even values of d, i.e. the depth of the search, shown below (for uneven values of d only one BFS would need to expand to a depth d/2, the other BFS would only need to expand to depth d/2−1):

$$t(\text{dBFS})=2\times(b^{d/2}+b^{d/2}-1+\ldots+b)$$

$$s(\text{dBFS})=m_{req}(\text{node})\times 2\times(b^{d/2}+b^{d/2}-1+\ldots+b),$$

where $m_{req}$ (node) refers to the space needed for storing a single node, i.e. as graph vertex, in memory. The above mentioned equations for the time t( ) and space s( ) are estimations of the average time in space needed because here a traversal of all nodes at depth d is assumed while a given search might terminate earlier. A node in the certificate graph can be represented by its web-of-trust key-ID. Assuming SHA-1 as the cryptographic hash function h( ) the space for storing a key-ID, i.e. $m_{req}$ (node) is 20 Bytes. Today's smart phones can achieve a Traversed Edges Per Second (TEPS) rate in graph processing of up to 0.5 GTEPS, meaning modern end-user devices can process up to $5\times10^8$ links per second in graph search.

Figure 6:
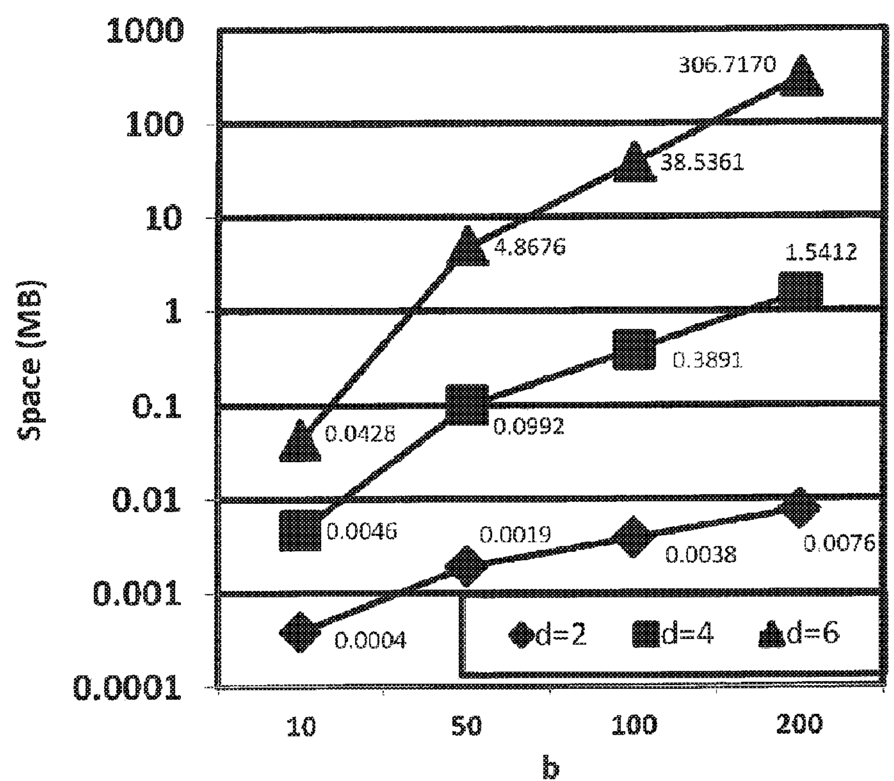
FIG. 6 shows the total amount of space needed to execute a dBFS algorithm of a method according to a sixth embodiment of the present invention.

FIG. 6 shows the total amount of space needed to execute a dBFS algorithm of a method according to a sixth embodiment of the present invention. The results shown in FIG. 6 show that the overall web-of-trust size is not relevant: Only search for a certificate chain up to depth d is relevant, further not meaningful for with respect to trust among users. Values for a depth of d=6 imply a long chain and even with 10 MTEPS d=4 and b=200 the computational resources in particular for a conventional base station as an example for a $D_{WoT}$-node are sufficient for executing the dBFS algorithm.

Figure 7:
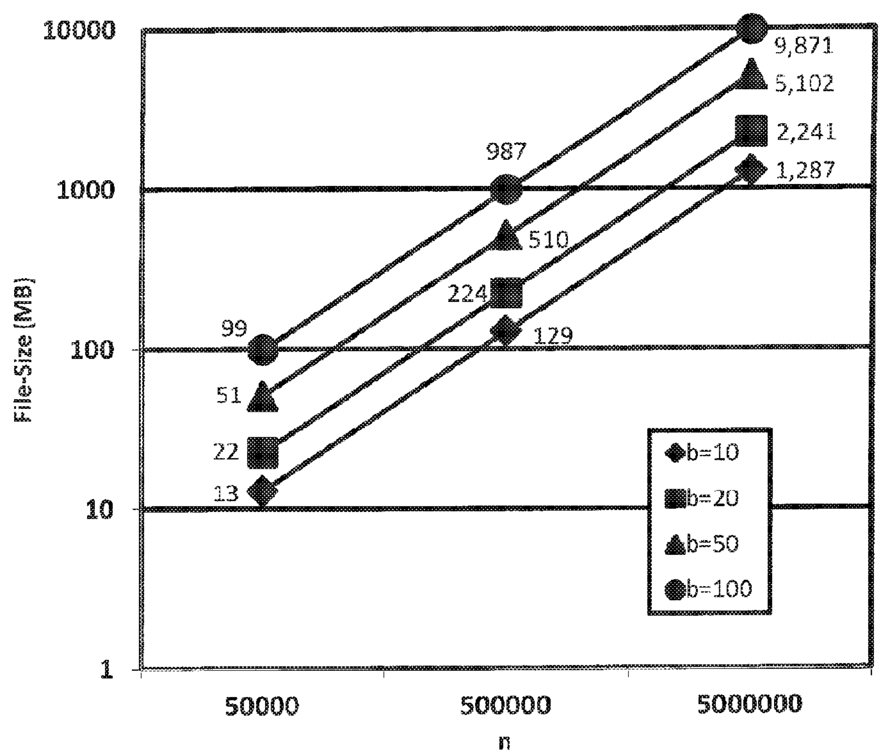
FIG. 7 shows key sizes for a web-of-trust key for different values of the branching factor b of a dBFS algorithm of a method according to a seventh embodiment of the present invention.

FIG. 7 shows key sizes for a web-of-trust key for different values of the branching factor b of a dBFS algorithm of a method according to a seventh embodiment of the present invention. In FIG. 7 it is shown how the web-of-trust file size scales with the total number of users n depending on the average number of identities a party of the web-of-trust has signed represented by the variable b, and assuming an average real-world-identity size of 50 Byte and a key-ID size of 20 Byte, i.e. 160 Bit as with the SHA-1. The web-of-trust certificate chain can be stored in the following compressed way: In this file format at first real-world identities are listed sequentially, followed by a list of the corresponding key-IDs in the same order. Then a third sequential list lists for each key-ID the key-ID it has signed. Hence the total size of such a file $f_{WoT}$ is given by $$\text{size}(f_{wot})=n\times(m_{req}(\text{name}))_{av}+n\times m_{req}(\text{node})+n\times b\times m_{req}(\text{node})\ [\text{in byte}]$$

wherein n the total number of nodes, here the users, in the web-of-trust and $(m_{req}\ (\text{name}))_{av}$ refers to the average space needed for storing a real-world identity.

The total size, size($f_{wot}$), does not impose a storage problem for conventional base stations even for large values of b, since for example Facebook has a median of 99 friends. However, for end-user devices with limited storage capabilities, size($f_{wot}$) may only be acceptable for storage on such devices when b is not too large. In any case, the size of the web-of-trust WoT file, size($f_{wot}$), grows linearly with the number of users, n. To handle transmission of large file sizes to end user devices, the whole web-of-trust WoT file does not have to be sent each time, but rather only the delta to the previous version. Furthermore, web-of-trust WoT files could be compressed to decrease the needed transmission bandwidth. Finally, hash extension techniques could be used to decrease the key-ID size, which would result in decreasing the total web-of-trust file size.

In summary an embodiment of the present invention enables a transitive decentralized message assessment preferably in social networks: A trustworthiness of messages can be assessed in a decentralized fashion and does not rely on a centralized public key infrastructure PKI or the like. The present invention extends the self-certifying property for real-world identities and further for only transitively known identities in a web-of-trust, for example a social network, proposing a dedicated naming scheme.

An embodiment of the present invention further works in "offline" scenarios using the concept of downloaded web-of-trust files so that any end-user not in the system can compute a certificate or trust chains and verify transitive trust chains by using services provided by decentralized access network nodes.

An embodiment of the present invention further enables a chaining of self-certifying names and web-of-trust identities cryptographically together: The hash of a public key is used as a self-certifying component in a content-oriented architecture naming schemes and at the same time as the key-ID in the web-of-trust. This cryptographically connects self-certifying names and the corresponding signed data items with real-world identities in decentralized fashion.

Even further the present invention is privacy preserving with respect to users publishing "on-behalf-of":Since a third party is only publishing as content under a specific on behalf of transitive name of a first party it is not obvious to infer for outsiders for what entities the third party has performed on-behalf-of publishing. In particular there is no name resolving to all the identities for which the third party has performed on-behalf-of publishing.

Even further the present invention provides that new relations among users can be added even during a disaster, i.e. when users are offline from a key server publishing trust files like WoT-files In this case the $D_{WoT}$ nodes, for example base stations preferably offer an enhanced functionality: The $D_{WoT}$ nodes then offer uploading or revoking of new certificates updating the corresponding local web-of-trust WoT-file accordingly. The $D_{WoT}$ nodes can then preferably be considered as lightweight key servers updated on the basis of a web-of-trust file enabling to add new links to the certificate graph and update the above trust file accordingly. Even further $D_{WoT}$ nodes within the same network fragment may update each other on such recent changes to the certificate graph.

Even further by using Delay tolerant network-like mechanisms $D_{WoT}$ nodes in different network fragments may update each other. When using instead of a web-of-trust file a centralized authority different of a web-of-trust key server may publish a verified real-world identity-to-public-key binding list. This enables an authentication and message assessment also in "offline" scenarios. The semantic of signature however would be different in centralized authority signs real-world identity-to-public-key bindings. The semantic binding may therefore be that a central entity checks a given policy and not that user consider each other trustworthy with respect to a given behavior. However, the naming scheme, in particular as described in the FIGS. above could also be used with a central authority making decisions on real-world identity-to-public-key bindings.

An embodiment of the present invention provides a naming scheme for authentication of transitive on-behalf-of messages, preferably in content-oriented architectures. The present invention further provides the naming scheme tying together self-certifying names and web-of-trust real-world identities. Even further cryptographically verifiable decentralized authentication in “offline” scenarios being offline from an authentication infrastructure is enabled using web-of-trust files dBFS search and the naming scheme of the present invention.

An embodiment of the present invention enables decentralized message assessment in “offline”—with respect to an authentication infrastructure—scenarios by tying together self-certifying names and web-of-trust real-world identities. Further the present invention enables transitive assessment of a trustworthiness of on-behalf-of messages and further addresses the scalability challenge for web-of-trust certificate graphs by providing a hybrid architecture where web-of-trust files are hosted and certificate chain computation services are offered preferably by decentralized access network nodes, for example base stations in mobile networks, in particular neither centralized at servers nor fully decentralized to end-devices.

An embodiment of the present invention further works in offline scenarios and the naming scheme is designed to tie self-certifying names and web-of-trust real-world identities. Even further attacks on certificate chains can preferably be mitigated by using more sophisticated schemes to evaluate certificate chains for deciding on trustworthiness, for example using more or more of independent paths from key-ID to key-ID in the web-of-trust in which case an attacker could need to infiltrate many paths to be considered trustworthy.

Further, an embodiment of the present invention is privacy preserving in terms of protecting overall relationships among users in the web-of-trust. Any end-user or a base station receiving a web-of-trust file can optionally query it to obtain all relationships among users, i.e. who signed who’s identity. Similar searches on trust relationships among the users are already known, for example in social networks like Xing, etc., enabling the present invention to be compatible with today’s social networks.

An embodiment of the present invention can be extended to work an even larger scale in the following way: Users may form a general multi-operator web-of-trust, where the key servers are maintained by an outside entity or by the operators together and in case of a disaster mobile networks may allow roaming users to post and retrieve urgent messages similar to allowing emergency cause in today’s networks.

An embodiment of the present invention preferably uses public-private key pairs having a unique key-ID which is the cryptographic hash of the public key. Users can upload certificates which have been signed by other users to these servers. The semantic of a signature is that the signer considers the real-world identity in the signature as trustworthy. This means that users can express how trustworthy they regard other users to be by signing the certificates of these users in their web-of-trust. Before the disaster users preferably promptly upload new certificates to the key server each time when having a real-world identity/self-certifying name binding.

Preferably all access network nodes of a certain type located close to end-users and not in the centralized part of the network, for example a base station in mobile networks or all nodes of type “Broadband Remote Access Server” BRAS in fixed networks, frequently for example once a day download the web-of-trust file published by the key servers. The web-of-trust file preferably contains a list of real-world identity to-public-key bindings where a) these bindings are assumed to be correct as the users trust the key server and b) any real-world identity or public key can be searched for a slow computational effort. These decentralized web-of-trust $D_{WoT}$ nodes may frequently download web-of-trust files from central key servers. Such a web-of-trust file may be compressed comprising compressed machine-readable format of the verified certificate graph for the whole web-of-trust file. For example such a file is for 40,000 ptp users in the range of 1.5 MB.

An embodiment of the present invention further uses some sort of a content-oriented architecture being available even after a disaster where a user can publish and retrieve content by querying for self-certifying names under a given naming scheme featuring some sort of publish and/or subscribe functionality such that users can subscribe to a certain name and retrieve for example either via frequent pull or via push new content for this name. Other parties can therefore publish “new content” for a given name providing some sort of versioning and users who subscribe to a given name can know which is the latest version of the content of the given name. Delay Tolerant Network DTN-like forwarding of messages across different disconnected sub-networks is therefore possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

The invention claimed is:

1. A method for assessing a message, wherein the message is communicated from a first party to a second party via a third party in a decentralized communication network, wherein the first party, the second party, and the third party share a common trust architecture, wherein the decentralized network utilizes a naming scheme in which names of parties under which content is published are denoted by a context part concatenated to a self-certifying part, and wherein a self-certifying identifier of the first party is previously provided to the second party, the method comprising:

a) publishing, under a transitive on-behalf-of name for the first party, content including a non-transitive on-behalf-of name for the third party and public security information of the third party, wherein the transitive on-behalf-of name for the first party is a reserved transitive on-behalf-of context part concatenated to the self-certifying identifier of the first party, and wherein the non-transitive on-behalf-of name for the third party is a reserved non-transitive on-behalf-of context part concatenated to a self-certifying identifier of the third party;

b) publishing, under a combination name for the first party and the third party, the message, wherein the published message is signed by the third party, and wherein the combination name for the first party and the third party is the reserved non-transitive on-behalf-of context part concatenated to the self-certifying identifier of the third party concatenated to the self-certifying identifier of the first party;

c) evaluating information published in step a) and step b) to extract the message by the second party as intended receiver of the message;

d) verifying a real-world-identity of the third party and/or the signature of the third party on the published message based on previously received trust information and/or based on the self-certifying identifier and the public security information of the third party, wherein a network-wide cryptographic hash function is used on the public security information of the third party to obtain the real-world-identity of the third party and/or the signature of the third party;

e) checking a trust information chain according to the common trust architecture from the second party to the third party, and f) assessing the message based on the checked trust information chain, wherein the self-certifying identifier of the first party and the self-certifying identifier of the third party are both provided as cryptographic information, and wherein the public security information of the third party is used for identification of the third party within the common trust architecture.

2. The method according to claim 1, wherein a functional decentralized local node is queried for a real-world identity of the first party by the third party to determine the self-certifying identifier of the first party.

3. The method according to claim 1, wherein for obtaining the trust information chain one or more functional decentralized local nodes located within the decentralized communication network are queried, wherein a functional decentralized local node provides trust information.

4. The method according to claim 1, wherein trust information is provided in a form of a web-of-trust file or a binding file comprising real-world-identity information associated with corresponding public security information.

5. The method according to claim 4, wherein the trust information is generated and updated by a functional decentralized local node in a part of the decentralized network to which the parties can connect.

6. The method according to claim 1, wherein step e) includes evaluating a length of the trust information chain and/or a number of independent paths between the first party and the second party.

7. The method according to claim 1, wherein the trust information chain is obtained by using a double-side breadth search first algorithm on the trust information.

8. The method according to claim 1, wherein trust information is revoked and/or updated upon a request of a party.

9. The method according to claim 1, wherein the trust information is compressed prior to storing.

10. The method according to claim 9, wherein the trust information is provided in a form of first real-world-identities listed sequentially, followed by a list of corresponding key-IDs in a same order.

11. A system for assessing a message, wherein the message is communicated from a first party to a second party via a third party in a decentralized communication network, wherein the first party, the second party, and the third party share a common trust architecture, wherein the decentralized network utilizes a naming scheme in which names of parties under which content is published are denoted by a context part concatenated to a self-certifying part, and wherein a self-certifying identifier of the first party is previously provided to the second party the system comprising:

the third party, operable to:

publish under a transitive on-behalf-of name for the first party, content including a non-transitive on-behalf-of name for the third party and public security information of the third party, wherein the transitive on-behalf-of name for the first party is a reserved transitive on-behalf-of context part concatenated to the self-certifying identifier of the first party, and wherein the non-transitive on-behalf-of name for the third party is a reserved non-transitive on-behalf-of context part concatenated to a self-certifying identifier of the third party, publish under a combination name for the first party and the third party, the message, wherein the published message is signed by the third party, and wherein the combination name for the first party and the third party is the reserved non-transitive on-behalf-of context part concatenated to the self-certifying identifier of the third party concatenated to the self-certifying identifier of the first party; and the second party, as intended receiver of the message, operable to:

evaluate information published by the third party to extract the published message, verify a real-world-identity of the third party and/or a signature of the third party on the published message based on previously received trust information and/or based on the self-certifying identifier and the public security information of the third party, wherein a network-wide cryptographic hash function is used on the public security information of the third party to obtain the real-world-identity of the third party and/or the signature of the third party;

check a trust information chain according to the common trust architecture from the second party to the third party, and assess the message based on the checked trust information chain, wherein the self-certifying identifier of the first party and the self-certifying identifier of the third party are both provided as cryptographic information, and wherein the public security information of the third party is used for identification of the third party within the common trust architecture.

* * * * *